Aug. 25, 1931. M. E. GASKINS 1,820,186
BAIT HOLDER
Filed Feb. 25, 1928
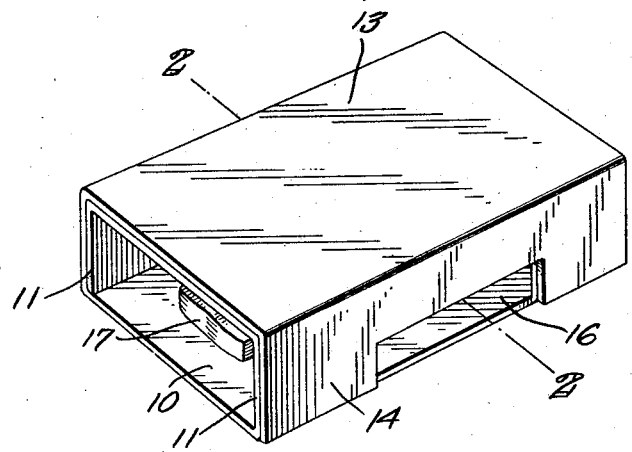
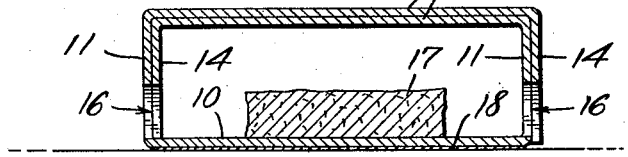
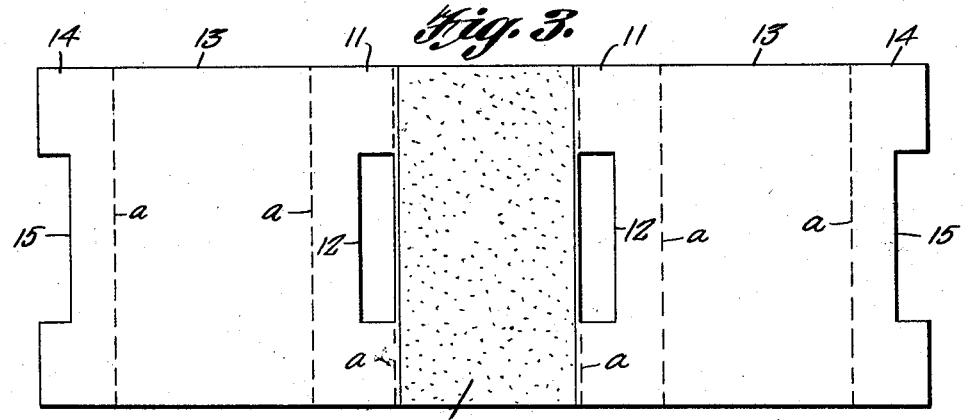
Maude E. Gaskins, INVENTOR
BY Victor J. Evans
ATTORNEY Patented Aug. 25, 1931

1,820,186

UNITED STATES PATENT OFFICE

MAUDE E. GASKINS, OF ARCADIA, FLORIDA

BAIT HOLDER

Application filed February 25, 1928. Serial No. 256,962.

This invention relates to bait holders for use in the extermination of insects, rodents, etc., an object being to provide a bait holder which may be temporarily anchored or secured in place so that it will remain stationary, and thus prove more readily attractive than a shiftable bait holder, the invention being especially adapted for use upon shipboard, dining cars, etc. In addition, the invention is also useful in hotels, restaurants, and other large public establishments, as well as in residences, the anchoring means preventing the "help" from sweeping out or otherwise inadvertently disposing of the holder.

Another object of the invention is the provision of a bait holder whose bottom is provided with a non-staining adhesive, and whose walls are provided with entrance openings for the passage of insects or rodents, which openings are also useful in attaching the holder in place.

Another object of the invention is the provision of a holder which may be made from a single blank of material to provide reinforcing top and side walls which will withstand the weight of many falling objects, and which will not collapse under ordinary usage.

With the above and other objects in view, the invention further includes the following novel features and details of construction, to be hereinafter more fully described, illustrated in the accompanying drawings and pointed out in the appended claims.

In the drawings:—

Figure 1 is a perspective view of a bait holder constructed in accordance with the invention.

Figure 2 is a section on the line 2—2 of Figure 1.

Figure 3 is a view of the blank from which the holder is made.

Referring to the drawings in detail wherein like characters of reference denote corresponding parts, as will be seen by reference to Figure 3, the holder comprises a central panel or bottom 10, from the opposite edges of which extend inner and outer side panels 11 having openings 12 therein. Extending from the side panels 11 are inner and outer top panels 13 and these panels 13 have extending therefrom inner and outer side panels 14. Notches 15 are provided in the panels 14.

The blank is folded along the dotted lines indicated at $a$ in Figure 3 so as to provide a transversely rectangular holder such as is illustrated in Figures 1 and 2, the panels being folded so as to provide double side walls 11 and 14 and a double top wall 13. The openings 12 register with the notches 15 so as to provide entrance openings 16 in the side walls, while the ends of the holder are also open to permit of the entrance of insects or rodents, in accordance with the size of the holder. A poisonous food of suitable character is placed within the holder as indicated at 17.

The lower face of the bottom 10 is provided with an adhesive indicated at 18 and this adhesive is of a non-staining and non-poisonous character, so that if desired it may be moistened by the tongue to attach the holder in place. As the adhesive is non-staining, the holder may be attached to any article without injury to the article.

As the top and side walls of the holder are reinforced, it will not readily collapse under the weight or impact of articles of average weight falling thereon.

As will be seen by reference to the drawings, the entrance openings 16 are arranged adjacent the bottom 10 and provide means for the insertion of the end of the finger into these openings to assist in securing the holder in place. As the holder may be readily stationarily positioned, it will not shift about when used upon shipboard or upon railroad trains and will not be accidentally swept out by careless "help". The holder may be made in various sizes suitable for either insects or rodents and as it is constructed of light preferably waterproof material it cannot be shifted about when being investigated by a rodent which would result in arousing his suspicions or frightening him away.

The invention is susceptible of various changes in its form, proportions and minor details of construction and the right is herein reserved to make such changes as properly fall within the scope of the appended claims.

Having described the invention what is claimed is:—

A bait holder comprising a single piece of material having each end notched and provided with spaced slots adjacent the medial portion thereof and folded upon itself to provide a rectangular shaped receptacle in cross section with each end fully open and with the notches and slots in alignment to provide entrances in the sides of the receptacle, a poisonous bait positioned in the receptacle on the bottom wall thereof, and adhesive applied to the outer face of the bottom wall of the receptacle for securing the latter to a surface of a support against accidental displacement therefrom by either a rodent or a person.

In testimony whereof I affix my signature.

MAUDE E. GASKINS.